UNITED STATES PATENT OFFICE.

LLEWELLYN L. LEATHERS AND FELIX CHAPPELLET, OF OAKLAND, CAL.

IMPROVEMENT IN THE MANUFACTURE OF ARTIFICIAL STONE.

Specification forming part of Letters Patent No. 178,307, dated June 6, 1876; application filed March 13, 1876.

*To all whom it may concern:*

Be it known that we, LLEWELLYN L. LEATHERS and FELIX CHAPPELLET, of Oakland, Alameda county, State of California, have invented an Improved Artificial Stone; and we do hereby declare the following description and accompanying drawings are sufficient to enable any person skilled in the art or science to which it most nearly appertains to make and use our said invention without further invention or experiment.

Our invention relates to a novel combination of materials for compounding and producing an artificial stone of superior strength and durability.

To make our artificial stone we first make a saponaceous solution or compound in the following manner: To ten pounds of hard-wood ashes we add eight gallons of water, and boil them together, so as to produce a weak lye. To this lye we then add eight pounds of some fatty, oily, or resinous substance, and boil moderately for eight hours, occasionally adding a small quantity of water, so as to preserve a uniform quantity of eight gallons and prevent concentration. We then add eight gallons of hot water, and boil for half-hour longer, when we strain the liquid off through a fine sieve into another vessel, allow it to cool, and then close tight for use. For a fatty substance we prefer to use lard, as it has given us the best result; but any of the oily or fatty substances used in the manufacture of soaps can be used. We then dissolve one pound of alum in twenty-eight gallons of clear cold water, and add two gallons of the above-described saponaceous liquid, and thoroughly mix them by stirring. Having thoroughly mixed four parts of clean sharp sand, or sand and gravel, with one part of good cement while dry, we add a sufficient quantity of the solution to dampen it, so that it can be properly tamped in the usual way. We are thus able to produce an artificial stone of great durability and hardness at a very slight expense for material.

Having thus described our invention, what we claim, and desire to secure by Letters Patent, is—

1. The process above described for making a saponaceous mixture or solution for the purpose specified.

2. An artificial stone composed of sand and cement moistened with a saponaceous mixture or solution, before tamping, in about the proportions hereinbefore named, substantially as and for the purpose above described.

LLEWELLYN L. LEATHERS.
FELIX CHAPPELLET.

Witnesses:
GEO. H. STRONG,
JOHN L. BOONE.